(12) United States Patent
Matsuoka

(10) Patent No.: US 9,015,798 B1
(45) Date of Patent: Apr. 21, 2015

(54) USER AUTHENTICATION USING POINTING DEVICE

(75) Inventor: Yoshimichi Matsuoka, Cupertino, CA (US)

(73) Assignee: Google Inc., Mountain View, CA (US)

( * ) Notice: Subject to any disclaimer, the term of this patent is extended or adjusted under 35 U.S.C. 154(b) by 111 days.

(21) Appl. No.: 13/398,564

(22) Filed: Feb. 16, 2012

(51) Int. Cl.
*G06F 21/00* (2013.01)
*G06F 21/31* (2013.01)

(52) U.S. Cl.
CPC ........................... *G06F 21/31* (2013.01)

(58) Field of Classification Search
None
See application file for complete search history.

(56) References Cited

U.S. PATENT DOCUMENTS

| | | | |
|---|---|---|---|
| 6,457,007 B1 * | 9/2002 | Kikuchi et al. ........................ 1/1 |
| 2001/0042201 A1 * | 11/2001 | Yamaguchi et al. .......... 713/151 |
| 2003/0093690 A1 * | 5/2003 | Kemper ........................ 713/201 |
| 2003/0103653 A1 * | 6/2003 | Avni et al. ..................... 382/119 |
| 2003/0165342 A1 * | 9/2003 | Popineau ........................ 398/127 |
| 2003/0182585 A1 * | 9/2003 | Murase et al. ................. 713/202 |
| 2003/0184589 A1 * | 10/2003 | Yamada et al. ............... 345/781 |
| 2005/0008148 A1 * | 1/2005 | Jacobson ........................ 380/26 |
| 2005/0101314 A1 * | 5/2005 | Levi ............................... 455/423 |
| 2006/0048236 A1 * | 3/2006 | Multerer et al. ................. 726/28 |
| 2009/0077653 A1 * | 3/2009 | Osborn et al. .................. 726/17 |
| 2010/0052851 A1 * | 3/2010 | Kaehler ...................... 340/5.81 |

* cited by examiner

*Primary Examiner* — Peter Poltorak
(74) *Attorney, Agent, or Firm* — Brake Hughes Bellermann LLP

(57) ABSTRACT

Methods and apparatus for performing user authentication using pointing device gestures are disclosed. An example method includes receiving, by a computing device, input data from a pointing device that is operatively coupled with the computing device, where the received input data corresponds with a user gesture, and comparing the received user gesture with one or more authorized user gestures to determine if the received user gesture matches one of the authorized user gestures, where each of the one or more authorized user gestures corresponds with at least one of a respective username and a respective password. If the received user gesture matches one of the authorized user gestures, the example method include granting access to the computing device and/or a user account. If the received user gesture does not match any of the authorized user gestures, the example method includes denying access to the computing device and/or the user account.

5 Claims, 6 Drawing Sheets

USER AUTHENTICATION USING POINTING DEVICE

TECHNICAL FIELD

This document relates, generally, to user authentication and multiple-user authentication using pointing device gesturing.

BACKGROUND

Users of computing devices often have to complete an authentication process in order to gain access to a computing device and/or to gain access one or more user accounts, such as email accounts, that may be accessed using a computing device. Such an authentication process may include a user entering, via a keyboard input device (keyboard), a username and a corresponding password in order to gain access to a given computing device or user account. However, in some instances, it may be inconvenient for a user to enter their username and password using a keyboard. For instance, another user may currently be using the keyboard. In other instances, the user may have forgotten or misplaced his or her username and/or password. Of course, other circumstances may exist where a user is unable, or would prefer not to utilize a computing device's keyboard to complete a user authentication process.

SUMMARY

In a general aspect, a computer-implemented method includes receiving, by a computing device, input data from a pointing device that is operatively coupled with the computing device, where the received input data corresponds with a user gesture. The computer-implemented method also includes comparing the received user gesture with one or more authorized user gestures to determine if the received user gesture matches one of the authorized user gestures, where each of the one or more authorized user gestures corresponds with at least one of a respective username and a respective password. In the event the received user gesture matches one of the authorized user gestures, the computer-implemented method includes granting access to at least one of the computing device and a user account. In the event the received user gesture does not match any of the authorized user gestures, the computer-implemented method includes denying access to the at least one of the computing device and the user account.

Implementations may include one or more of the following features. For example, granting access may include granting access to the at least one of the computing device and the user account in accordance with one or more permissions associated with the respective username that correspond with the matching authorized user gesture.

The computer-implemented method may include receiving, in conjunction with the received user gesture, a user provided username. Comparing the received user gesture with the one or more authorized user gestures may include comparing the user provided username with the respective usernames corresponding with the authorized user gestures. Determining if the received user gesture matches one of the authorized user gestures may include determining if the received user gesture and the user provided username match, respectively, one of the authorized user gestures and its corresponding username.

The computer-implemented method may include receiving, in conjunction with the received user gesture, a user provided password. Comparing the received user gesture with the one or more authorized user gestures may include comparing the user provided password with the respective passwords corresponding with the authorized user gestures. Determining if the received user gesture matches one of the authorized user gestures may include determining if the received user gesture and the user provided password match, respectively, one of the authorized user gestures and its corresponding password.

The received input data may include data representing at least one of a trace pattern corresponding with movement of the pointing device, speed of movement of the pointing device and one or more key clicks from one or more keys of the pointing device. The received input data may include data representing a user signature. Comparing the received user gesture with the one or more authorized user gestures may include comparing the received user gesture with the one or more authorized user gestures using handwriting recognition logic.

In another general aspect, a computer-implemented method includes providing, by a computing device, a first user-interface for a first authenticated user of the computing device. The first user-interface includes a first cursor corresponding with a first pointing device that is operably coupled with the computing device. The computer-implemented method also includes receiving input data from one of the first pointing device and a second pointing device that is operatively coupled with the computing device, where the received input data corresponds with a user gesture. The computer-implemented method further includes comparing the received user gesture with one or more authorized user gestures to determine if the received user gesture matches one of the authorized user gestures. Each of the one or more authorized user gestures corresponds with a respective username. In the event the received user gesture matches one of the authorized user gestures, the computer-implemented includes determining if the respective username corresponding with the matching authorized user gesture is different than a username associated with the first authenticated user. In the event the respective username corresponding with the matching authorized user gesture is different than the username associated with the first authenticated user, the computer-implemented method includes authenticating a user that provided the received user gesture as a second authenticated user of the computing device, and providing a second user interface for the second authenticated user, where the second user interface includes a second cursor. In the event the received user gesture does not match any of the authorized user gestures, the computer-implemented method includes denying the user that provided the received user gesture access to the computing device.

Implementations may include one or more of the following features. For example, the first user interface and the second user interface may be provided on a single display device that is operably coupled with the computing device. The first user interface and the second user interface may be provided, respectively, on separate display devices that are each operably coupled with the computing device.

The first cursor and the second cursor may have different visual appearances. The second cursor may correspond with the second pointing device.

The received input data may include data representing at least one of a trace pattern corresponding with movement of the one of the first pointing device and the second pointing device from which the user gesture input data is received, speed of movement of the one of the first pointing device and the second pointing device from which the user gesture input data is received and one or more key clicks from one or more keys of the one of the first pointing device and the second pointing device from which the user gesture input data is received.

In another general aspect, a non-transitory, machine-readable medium has instructions stored thereon. The instructions, when executed by a processor, cause a computing device to receive input data from a pointing device that is operatively coupled with the computing device, where the received input data corresponds with a user gesture. The instructions, when executed by the processor, further cause the computing device to compare the received user gesture with one or more authorized user gestures to determine if the received user gesture matches one of the authorized user gestures, where each of the one or more authorized user gestures corresponds with at least one of a respective username and a respective password. In the event the received user gesture matches one of the authorized user gestures, the instructions, when executed by the processor, further cause the computing device to grant access to at least one of the computing device and a user account. In the event the received user gesture does not match any of the authorized user gestures, the instructions, when executed by the processor, further cause the computing device to deny access to the at least one of the computing device and the user account.

Implementations may include one or more of the following features. For example, the instructions, when executed by the processor, may further cause the computing device to receive, in conjunction with the received user gesture, a user provided username. Comparing the received user gesture with the one or more authorized user gestures may include comparing the user provided username with the respective usernames corresponding with the authorized user gestures. Determining if the received user gesture matches one of the authorized user gestures may include determining if the received user gesture and the user provided username match, respectively, one of the authorized user gestures and its corresponding username.

The instructions, when executed by the processor, may further cause the computing device to receive, in conjunction with the received user gesture, a user provided password. Comparing the received user gesture with the one or more authorized user gestures may include comparing the user provided password with the respective passwords corresponding with the authorized user gestures. Determining if the received user gesture matches one of the authorized user gestures may include determining if the received user gesture and the user provided password match, respectively, one of the authorized user gestures and its corresponding password.

In another general aspect, a non-transitory, machine-readable medium has instructions stored thereon. The instructions, when executed by a processor, cause a computing device to provide a first user-interface for a first authenticated user of the computing device, the first user-interface including a first cursor corresponding with a first pointing device that is operably coupled with the computing device. The instructions, when executed by the processor, further cause the computing device to receive input data from one of the first pointing device and a second pointing device that is operatively coupled with the computing device, where the received input data corresponds with a user gesture. The instructions, when executed by the processor, further cause the computing device to compare the received user gesture with one or more authorized user gestures to determine if the received user gesture matches one of the authorized user gestures, where each of the one or more authorized user gestures corresponds with a respective username. In the event the received user gesture matches one of the authorized user gestures, the instructions, when executed by the processor, further cause the computing device to determine if the respective username corresponding with the matching authorized user gesture is different than a username associated with the first authenticated user. In the event the respective username corresponding with the matching authorized user gesture is different than the username associated with the first authenticated user, the instructions, when executed by the processor, further cause the computing device to authenticate a user that provided the received user gesture as a second authenticated user of the computing device and provide a second user interface for the second authenticated user, where the second user interface includes a second cursor. In the event the received user gesture does not match any of the authorized user gestures, the instructions, when executed by the processor, further cause the computing device to deny the user that provided the received user gesture access to the computing device.

DETAILED DESCRIPTION

Figure 1:
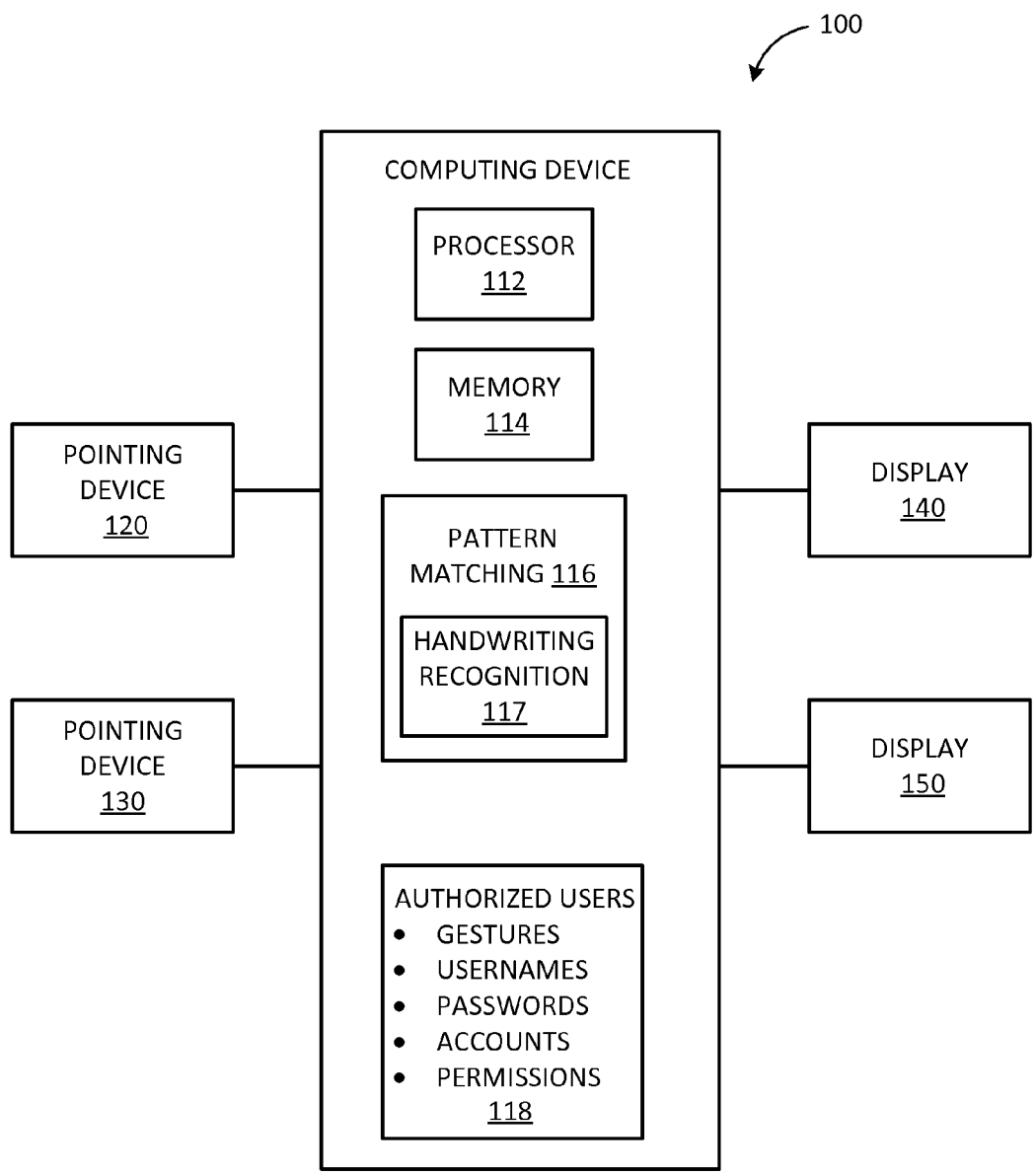
FIG. 1 is a block diagram illustrating a computing system in accordance with an example embodiment.

FIG. 1 is a block diagram illustrating a computing system 100 in accordance with an example embodiment. The computing system 100 may be used for authenticating users of the computing system 100 based on user gestures, such as using the approaches described herein. As shown in FIG. 1, the computing system 100 includes a computing device 110. The computing device 110 may be, for example, a desktop computer, a laptop computer, a notebook computer, a netbook computer or a tablet computer. Of course, the computing device 110 may take other appropriate forms and the particular device that is used to implement the computing device 110 may depend on the specific embodiment.

The computing system 100 illustrated in FIG. 1 further includes a first pointing device 120 and a second pointing device 130, where the pointing devices 120 and 130 are operably coupled with the computing device 110. The pointing devices 120 and 130 may be used to provide input data to the computing device 110, where the input data corresponds with a user gesture that may be used to authenticate users of the computing device 110 in accordance with the approaches described herein. In the computing system 100, the pointing devices 120 and 130 may take a number of forms. For example, each of the pointing devices 120 and 130 may be implemented as one of a mouse (e.g., a wireless mouse or a wired mouse), a trackpad, a trackball or a stylus. Of course, the pointing devices 120 and 130 may take a number of other appropriate forms. Also, in some embodiments, one or both of the pointing devices 120 and 130 may be integrated with the computing device 110. In other embodiments, the computing system 100 may only include a single pointing device.

The computing system 100 also includes a first display 140 and a second display 150, where the displays 140 and 150 are operably coupled with the computing device 110. As with the pointing devices 120 and 130, the displays 140 and 150 may take a number of forms. For instance, each of the displays 140 and 150 may be implemented as one of a liquid crystal display, a light emitting diode display, or other type of display. Further, in some embodiments, one or both of the displays 140 and 150 may be integrated with the computing device 110. In other embodiments, the computing system 100 may only include a single display.

As shown in FIG. 1, the computing device 110 of the computing system 100 includes a processor 112, memory 114, a pattern matching module 116 and a table or database (hereafter "table") of authorized users 118. Also, the pattern matching module 116 of the computing device 110 includes a handwriting recognition module 117. As is described in further detail below, the pattern matching module may be configured to compare user gestures received from the pointing devices 120 and 130 for the purposes of authenticating users, where the patterns may correspond with a user's signature or, alternatively, may correspond with non-signature patterns that users may provide for purposes of authentication.

The particular configuration of the computing device 110 shown in FIG. 1 is given by way of example for purposes of illustration. Depending on the particular embodiment, the computing device 110 may include other elements. Further, the elements of the computing device 110 may be arranged in other fashions. For example, the pattern matching module 116 (e.g., including the handwriting recognition module 117) may comprise machine-readable instructions that are stored in the memory 114. Those instructions may be executed by the processor 112 in order to implement pattern matching for comparing received user gestures with authorized user gestures (e.g., for matching user gestures received from either of the pointing devices 120 and 130 with authorized user gestures that are stored in the table of authorized users 118), such as in accordance with the approaches described herein.

As shown in FIG. 1, the table of authorized users 118 of the computing device 110 may include user gestures that the computing device 110 (based on comparisons performed by the pattern matching module 116) considers to be valid authentication gestures for authorized users of the computing system 100. For this particular embodiment, the table of authorized users 118 may also include, for each authorized user gesture: an associated username; a password or passwords corresponding with the associated username; information for one or more user accounts corresponding with the associated username; and/or permissions associated with the corresponding username. Such permissions may be access privileges for the computing device 110 and/or access privileges for the one or more user accounts that correspond with a given username. In such an approach, users may use authorized user gestures to gain access to use of the computing device 110 and/or to gain access to one or more user accounts using the computing device 110, such as online email accounts, social network website accounts, accounts local to the computing device 110, or a number of other types of user accounts. In other embodiments, the table of authorized users 118 may include additional information, less information or different information.

In some embodiments, a user may be authenticated by the computing device 110 based only on a provided user gesture. In such approaches, the provided user gesture may operate as both a username and a corresponding password. In other embodiments, a user may be authenticated by the computing device 110 based on a user gesture that is provided in conjunction with a corresponding username. In such approaches, the provided user gesture may operate as a password that corresponds with the provided username. In still other embodiments, a user may be authenticated by the computing device 110 based on a user gesture that is provided in conjunction with a corresponding password. In such approaches, the provided user gesture may operate as a username that corresponds with the provided password.

Figure 2A:
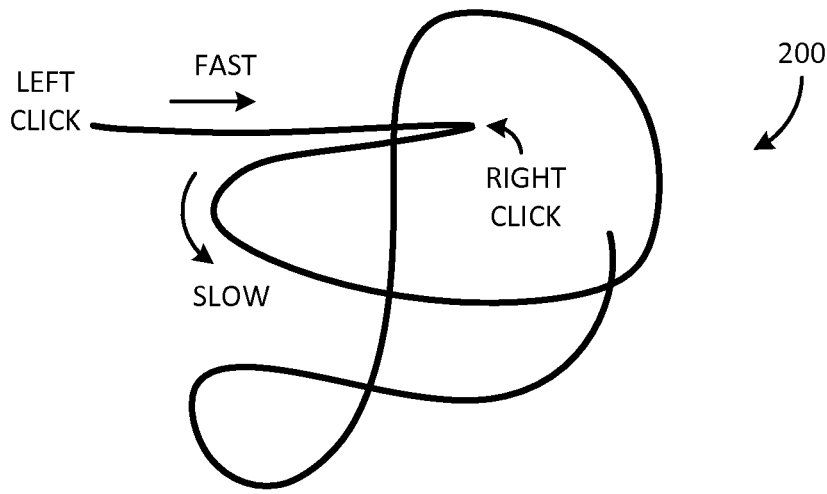
FIGS. 2A and 2B are diagrams illustrating user gestures that may be used for user authentication in accordance with an example embodiment.
Figure 2B:
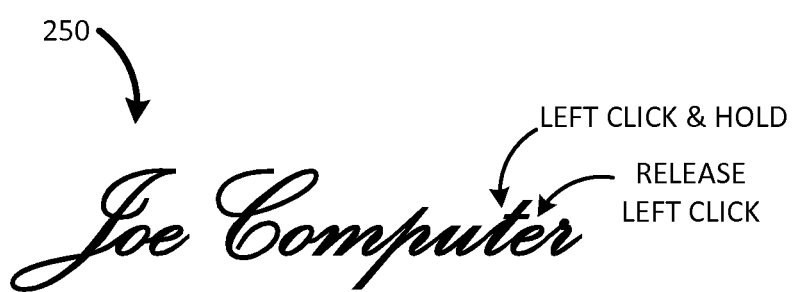

FIGS. 2A and 2B are diagrams illustrating user gestures 200 and 250 that may be used for user authentication in accordance with an example embodiment. The computing system 100 may use the user gestures 200 and 250 for authenticating corresponding users in accordance with the approaches described herein. Accordingly, for purposes of illustration, the user gestures 200 and 250 are described with further reference to the computing system 100 illustrated in FIG. 1. It will be appreciated, however, that the user gestures 200 and 250 may be used to authenticate users for computing systems having other configurations.

The user gesture 200 shown in FIG. 2A illustrates a non-signature user gesture that a user may provide in order to gain access to the computing device 110 and/or to gain access to one or more user accounts (e.g., via the computing device 110), based on, for example, information included in the table of authorized users 118. In comparison, the user gesture 250 shown in FIG. 2B illustrates a signature user gesture for a user "Joe Computer" that may correspond with a signature of an authorized user of the computing device 110. In like fashion as the user gesture 200, a user may provide the user gesture 250 in order to gain access to the computing device 110 and/or to gain access to one or more user accounts with the computing device 110.

As was discussed above with respect to FIG. 1, the user gestures 200 and 250 may be provided to the computing device (e.g., in the form of pointing device input data) using either the pointing device 120 or the pointing device 130. In an example embodiment, the computing device 110 may be configured to continuously monitor activity of the pointing devices 120 and 130 (e.g., x-y location, movement speed and key clicks) and compare that activity with authorized user gestures contained in the table of authorized users 118. In other embodiment, a user may explicitly indicate his or her intention to provide a user gesture for authentication purposes. For instance, the user may enter a specific key sequence, or may select an icon on a user interface of the computing system 100 to indicate an intention to provide a user gesture for authentication. In still other embodiments, other approaches may be used for recognizing user gestures for authentication.

As illustrated in FIGS. 2A and 2B, the input data corresponding with the user gestures 200 and 250 may include a trace pattern corresponding with movement of a pointing device (e.g., the pointing device 120 or the pointing device 230), speed of movement of the pointing device when entering the user gesture and/or one or more key clicks from one or more keys of the pointing device. For example, a user entering the user gesture 200 with a pointing device may perform a "left click" followed by a fast left to right horizontal movement of the mouse. The user may then perform a "right click" before completing the remaining portion of the trace pattern of the user gesture 200 with slow movement of the pointing device. The pattern matching module 116 of the computing device 110 may then compare the received input data for the user gesture 200 with authorized user gestures included in the table of authorized users 118 in order to determine whether or not the user gesture 200 is an authorized user gesture.

Referring now to FIG. 2B, a user entering the signature user gesture 250 may enter the gesture using, for example, a trackpad pointing device or a stylus pointing device. For instance, the user may make contact with the trackpad and write "Joe", momentarily break contact with the trackpad, reestablish contact with the trackpad and write "Computer" without crossing the "t." The user may then again momentarily break contact with trackpad before crossing the "t" in "Computer." As shown in FIG. 2B, the user may click and hold a left button of the trackpad while crossing the "t" and then release the left button after crossing the "t." The pattern matching module 116 of the computing device 110 may be configured, when examining the input data corresponding with the user gesture 250, to recognize that the user gesture 250 is a signature user gesture. The pattern matching module 116 may then be configured to use the handwriting recognition module 117 to compare the received input data for the user gesture 250 with authorized user gestures included in the table of authorized users 118 in order to determine whether or not the user gesture 250 is an authorized user gesture.

Figure 3A:
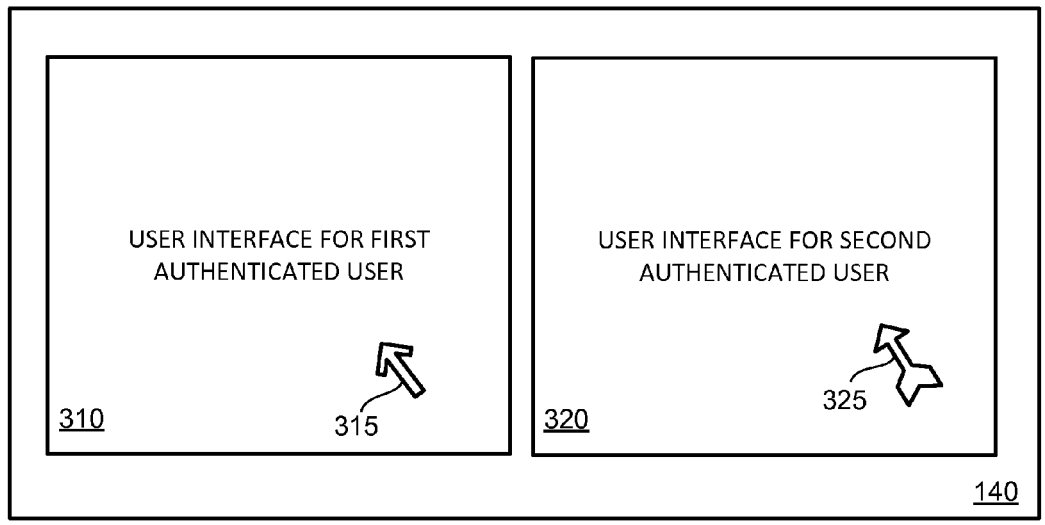
FIGS. 3A and 3B are block diagrams illustrating approaches for providing user interfaces in accordance with example embodiments.
Figure 3B:
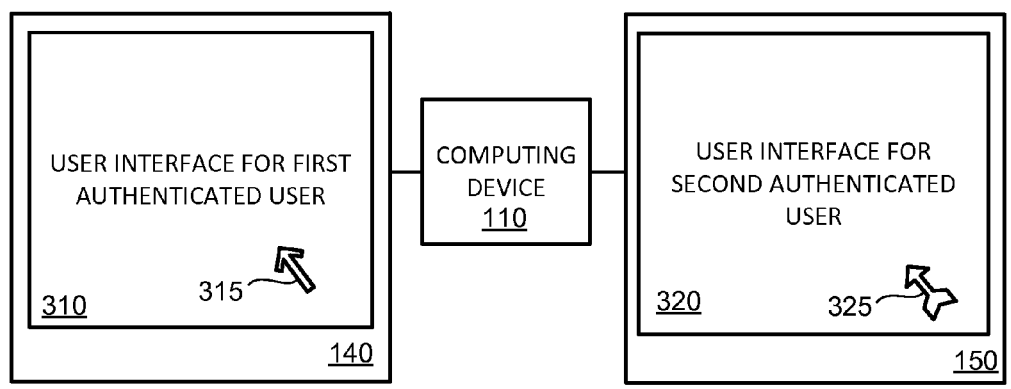

FIGS. 3A and 3B are block diagrams illustrating approaches for providing user interfaces in accordance with example embodiments. The approaches illustrated in FIGS. 3A and 3B may be implemented using the computing system 100 shown in FIG. 1. Accordingly, FIGS. 3A and 3B are illustrated using elements of, and with further reference to FIG. 1. FIGS. 3A and 3B illustrate example embodiments including multiple user interfaces that may be provided using the computing system 100 in response to authentication of user using user gestures, such as described herein. It will be appreciated, however, that the user interfaces 310 and 320 may be provided in other fashions and using computing systems having different configurations.

In each of the approaches illustrated in FIGS. 3A and 3B, first user interface 310 is provided for a first authenticated user. The first authenticated user may be authenticated using a user gesture in accordance with the approaches described herein or using other approaches. Additionally, a second user interface 320 is provided for a second authenticated user, where the second user may be authenticated using a user gesture while the first authenticated user continues to use the computing system 100. As illustrated in FIGS. 3A and 3B, the first user interface may include a first cursor 315, while the second user interface 320 may include a second cursor 325, where the first cursor 315 and the second cursor 325 have different visual appearances. Such an approach allows the first and second authenticated users to be able to easily identify the respective cursor corresponding with their respective user interface.

FIG. 3A illustrates an approach where the first user interface 310 and the second user interface 320 are both provided, side by side, on the display 140 of the computing device 100. Alternatively, the user interfaces 310 and 320 could both be provided on the display 150 of the computing system 100. In comparison, FIG. 3B illustrates an approach where, using the computing system 100 and the computing device 110, the first user interface 310 (and its cursor 315) are provided on the display 140, while the second user interface 320 (and its cursor 325) are provided separately, on the display 150.

Figure 4:
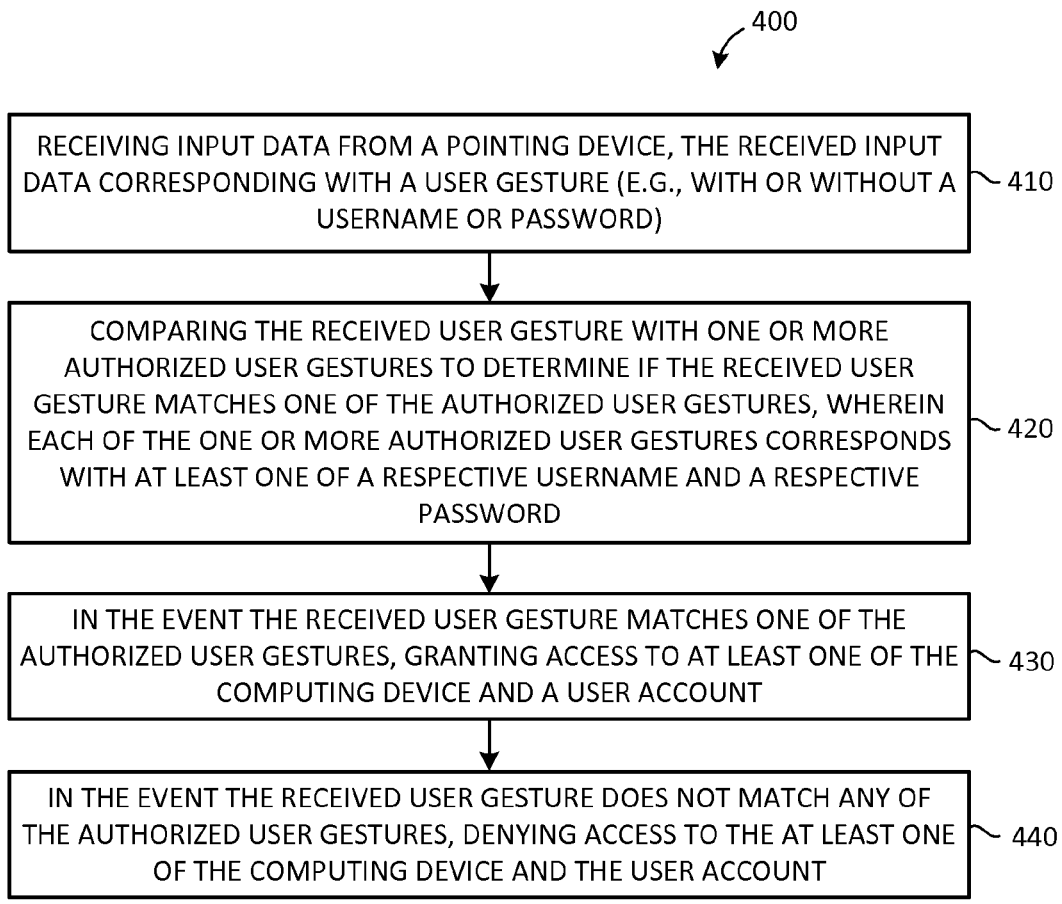
FIG. 4 is a flowchart illustrating a method for authenticating a user in accordance with an example embodiment.

FIG. 4 is a flowchart illustrating a method 400 for authenticating a user in accordance with an example embodiment. The method 400 may be implemented in the computing system 100 of FIG. 1 using user gestures, such as the user gestures 200 and 250 illustrated in FIGS. 2A and 2B. Accordingly, for purposes of illustration, the method 400 will be described with further reference to FIGS. 1, 2A and 2B, as appropriate. It will be appreciated however, that the method 400 may be implemented in computing systems having different configurations than the computing system 100 and may utilize user gestures other than those described with respect to FIGS. 2A and 2B.

The method 400 includes, at block 410, receiving, e.g., by the computing device 110, input data from a pointing device that is operatively coupled with the computing device 100, such as the pointing device 120, where the received input data corresponds with a user gesture, such as the user gesture 200. At block 420, the method 400 includes comparing (e.g., by the pattern matching module 116, or the handwriting recognition module 117 for signature user gestures) the received user gesture 200 with one or more authorized user gestures. For instance, the received user gesture may be compared with user gestures in the table of authorized users 118 to determine if the received user gesture 200 matches one of the authorized user gestures. In the method 400, each of the one or more authorized user gestures may correspond with at least one of a respective username and a respective password, e.g., in the table of authorized users 118.

In certain embodiments, the user gesture 200 provided at block 410 may be provided in conjunction with one of a user provided username or a user provided password. If the user gesture 200 (provided at block 410) is provided in conjunction with a user provided username, the comparison at block 420 may include comparing the user provided username with the respective usernames corresponding with the authorized user gestures in the table of authorized users 118. Furthermore, if the user gesture 200 provided at block 410 is provided in conjunction with a user provided username, determining if the received user gesture matches one of the authorized user gestures at block 420 may include determining if the received user gesture and the user provided username match, respectively, one of the authorized user gestures and its corresponding username.

Likewise, if the user gesture 200 (provided at block 410) is provided in conjunction with a user provided password, the comparison at block 420 may include comparing the user provided password with the respective passwords corresponding with the authorized user gestures in the table of authorized users 118. Furthermore, if the user gesture 200 (at block 410) is provided in conjunction with a user provided password, determining if the received user gesture matches one of the authorized user gestures at block 420 may include determining if the received user gesture and the user provided password match, respectively, one of the authorized user gestures and its corresponding password.

At block 430, if the received user gesture 200 matches one of the authorized user gestures in the table of authorized users 118, the method 400 includes granting access to at least one of the computing device and a user account. Information for the user account, as well as associated permissions for the computing device 100 and the user account may also be listed in the table of authorized users 118, as was discussed above with respect to FIG. 1. At block 440, if the received user gesture 200 does not match any of the authorized user gestures in the table of authorized users 118, the method 400 includes denying access to the at least one of the computing device and the user account.

Figure 5:
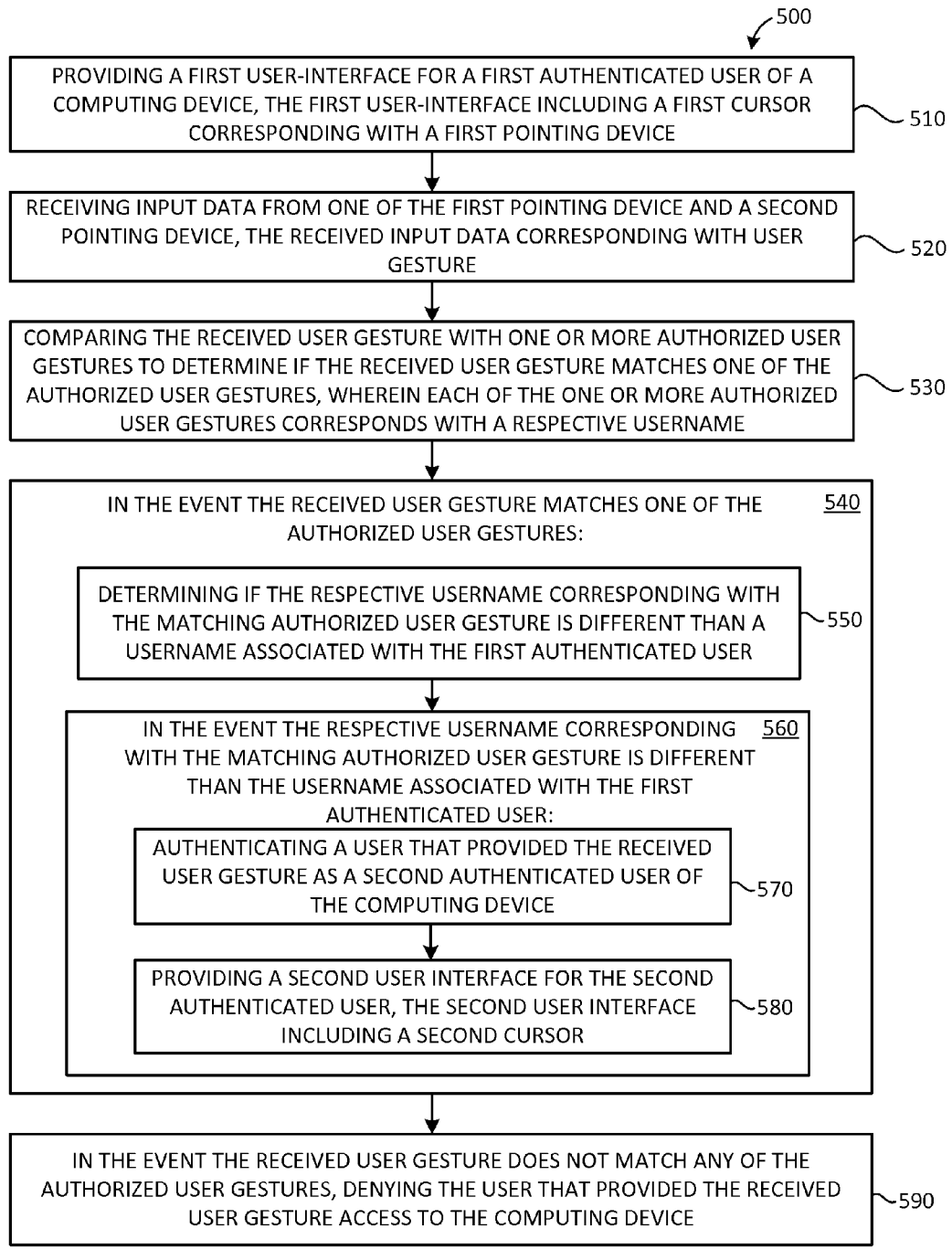
FIG. 5 is flow chart illustrating another method for authentication a user in accordance with an example embodiment.

FIG. 5 is flow chart illustrating a method 500 for authenticating a user in accordance with an example embodiment. The method 500 may be implemented in the computing system 100 of FIG. 1 using user gestures, such as the user gestures 200 and 250 illustrated in FIGS. 2A and 2B and multiple user interfaces, such as those illustrated in FIGS. 3A and 3B. Accordingly, for purposes of illustration, the method 500 will be described with further reference to FIGS. 1, 2A, 2B, 3A and 3B, as appropriate. It will be appreciated however, that the method 500 may be implemented in computing systems having different configurations than the computing system 100 and may utilize user gestures and approaches for providing user interfaces other than those described with respect to FIGS. 2A, 2B, 3A and 3B.

The method 500 includes, at block 510, providing, e.g., by the computing system 100, a first user-interface, such as the user interface 310, for a first authenticated user of the computing device 110. In method 500, the first user-interface 310 may include a first cursor, such as the cursor 315, which corresponds with a first pointing device that is operably coupled with the computing device 110, e.g., the pointing device 120.

At block 520, the method 500 includes receiving, by the computing device 110, input data from either the pointing device 120 or the pointing device 130, where the received input data corresponds with a user gesture, such as the user gesture 250. At block 530, the method 500 includes comparing (e.g., by the handwriting recognition module 117 of the pattern matching module 116) the received user gesture 250 with one or more authorized user gestures. For instance, the received user gesture 250 may be compared with user gestures in the table of authorized users 118 to determine if the received user gesture 250 matches one of the authorized user gestures. As with the method 400, in the method 500, each of the one or more authorized user gestures may correspond with at least one of a respective username and a respective password in the table of authorized users 118.

In like fashion as the method 400, in certain embodiments, the user gesture 250 provided at block 520 may be provided in conjunction with one of a user provided username or a user provided password. If the user gesture 250 (of block 520) is provided in conjunction with a user provided username, the comparison at block 530 may include comparing the user provided username with the respective usernames corresponding with the authorized user gestures in the table of authorized users 118. Furthermore, if the user gesture 250 provided at block 520 is provided in conjunction with a user provided username, determining if the received user gesture 250 matches one of the authorized user gestures at block 530 may include determining if the received user gesture 250 and the user provided username match, respectively, one of the authorized user gestures and its corresponding username.

Likewise, if the user gesture 250 (of block 520) is provided in conjunction with a user provided password, the comparison at block 530 may include comparing the user provided password with the respective passwords corresponding with the authorized user gestures in the table of authorized users 118. Furthermore, if the user gesture 250 of block 520 is provided in conjunction with a user provided password, determining if the received user gesture 250 matches one of the authorized user gestures at block 530 may include determining if the received user gesture 250 and the user provided password match, respectively, one of the authorized user gestures and its corresponding password.

At block 540, if the received user gesture 250 matches one of the authorized user gestures, the method 500 may include one or more of the operations 550, 560, 570 and 580. At block 550, the method 500 includes determining if the respective username corresponding with the matching authorized user gesture is different than a username associated with the first authenticated user. If the usernames are the same, the method 500 may conclude.

At block 560, if the respective username corresponding with the matching authorized user gesture is different than the username associated with the first authenticated user, the method 500 includes the operations of blocks 570 and 580. At block 570, the method 500 includes authenticating a user that provided the received user gesture 250 as a second authenticated user of the computing device 110. At block 580, the method 500 includes providing a second user interface for the second authenticated user, such as user interface 320, where the second user interface 320 includes the second cursor 325. In the method 500, the first user interface 310 and the second user interface 320 may be provided using, for example, one of the approaches illustrated in FIGS. 3A and 3B.

If, at block 520, the received user gesture 250 does not match any of the authorized user gestures, the operations of block 540 are not performed. In this situation, the method 500 instead includes, at block 590, denying the user that provided the received user gesture access to the computing device.

Figure 6:
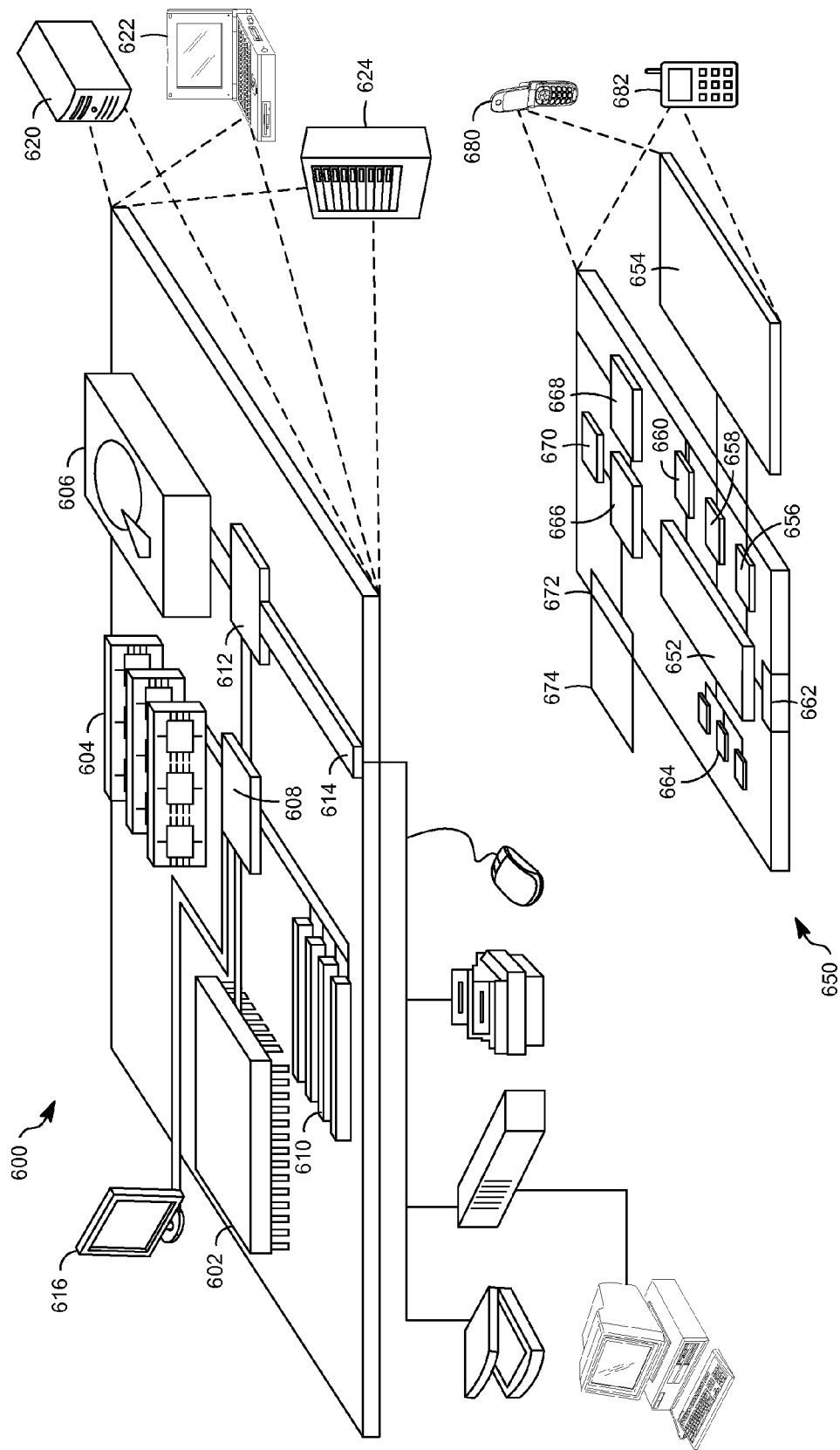
FIG. 6 is a diagram that illustrates a computing device and a mobile computing device that can be used to implement the techniques described herein in accordance with an example embodiment.

FIG. 6 is a diagram that shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 684 may also be provided and connected to device 650 through expansion interface 682, which may include, for example, a SIMM (Single In Line Memory Module) card interface. Such expansion memory 684 may provide extra storage space for device 650, or may also store applications or other information for device 650. Specifically, expansion memory 684 may include instructions to carry out or supplement the processes described above, and may include secure information also. Thus, for example, expansion memory 684 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 684, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 680 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    providing, by a computing device, a first user-interface for a first authenticated user of the computing device, the first user-interface including a first cursor corresponding with a first pointing device that is operably coupled with the computing device;
    receiving, by the computing device, input data from one of the first pointing device and a second pointing device that is operatively coupled with the computing device, the received input data corresponding with a user gesture;
    comparing the received user gesture with one or more authorized user gestures to determine if the received user gesture matches one of the authorized user gestures, wherein each of the one or more authorized user gestures corresponds with a respective user identifier;
    in the event the received user gesture matches one of the authorized user gestures:
        determining if the respective user identifier corresponding with the matching authorized user gesture is different than a user identifier associated with the first authenticated user; and
        in the event the respective user identifier corresponding with the matching authorized user gesture is different than the user identifier of the first authenticated user:
            authenticating a user that provided the received user gesture as a second authenticated user of the computing device; and
            providing a second user interface for the second authenticated user, the second user interface including a second cursor, the first user interface and the second user interface being configured to allocate resources of the computing device to the first pointing device and the second pointing device simultaneously, the first user interface and the second user interface being provided on a single display operably coupled with the computing device; and
    in the event the received user gesture does not match any of the authorized user gestures, denying the user that provided the received user gesture access to the computing device.

2. The computer-implemented method of claim 1, wherein the first cursor and the second cursor have different visual appearances.

3. The computer-implemented method of claim 1, wherein the second cursor corresponds with the second pointing device.

4. The computer-implemented method of claim 1, wherein the received input data comprises data representing at least one of:
    a trace pattern corresponding with movement of the one of the first pointing device and the second pointing device from which the user gesture input data is received;
    speed of movement of the one of the first pointing device and the second pointing device from which the user gesture input data is received; and
    one or more key clicks from one or more keys of the one of the first pointing device and the second pointing device from which the user gesture input data is received.

5. A non-transitory, machine-readable medium having instructions stored thereon, the instructions, when executed by a processor, cause a computing device to:
    provide a first user-interface for a first authenticated user of the computing device, the first user-interface including a first cursor corresponding with a first pointing device that is operably coupled with the computing device;
    receive input data from one of the first pointing device and a second pointing device that is operatively coupled with the computing device, the received input data corresponding with a user gesture;
    compare the received user gesture with one or more authorized user gestures to determine if the received user gesture matches one of the authorized user gestures, wherein each of the one or more authorized user gestures corresponds with a respective user identifier;
in the event the received user gesture matches one of the authorized user gestures:
   determine if the respective user identifier corresponding with the matching authorized user gesture is different than a user identifier associated with the first authenticated user; and
   in the event the respective user identifier corresponding with the matching authorized user gesture is different than the user identifier of the first authenticated user:
      authenticate a user that provided the received user gesture as a second authenticated user of the computing device; and
      provide a second user interface for the second authenticated user, the second user interface including a second cursor, the first user interface and the second user interface being configured to allocate resources of the computing device to the first pointing device and the second pointing device simultaneously, the first user interface and the second user interface being provided on a single display operably coupled with the computing device; and
in the event the received user gesture does not match any of the authorized user gestures, deny the user that provided the received user gesture access to the computing device.

* * * * *